(12) United States Patent
Pettersson et al.

(10) Patent No.: US 6,397,475 B1
(45) Date of Patent: Jun. 4, 2002

(54) CHAINSAW GUIDE BAR HAVING LIQUID-CONDUCTING CHANNELS

(75) Inventors: Karl-Olov Pettersson, Humboldt; Karl-Erik Forsberg, Jackson, both of TN (US)

(73) Assignee: Blount, Inc., Montgomery, AL (US)

( * ) Notice: Subject to any disclaimer, the term of this patent is extended or adjusted under 35 U.S.C. 154(b) by 0 days.

(21) Appl. No.: 09/698,069

(22) Filed: Oct. 30, 2000

(30) Foreign Application Priority Data

Oct. 28, 1999 (SE) .............................................. 9903889

(51) Int. Cl.⁷ .............................................. B27B 17/12
(52) U.S. Cl. ......................................... 30/123.4; 30/383
(58) Field of Search ................................ 30/123.4, 383, 30/384, 387, 515; 144/34.1, 380; 47/1.5

(56) References Cited

U.S. PATENT DOCUMENTS

| | | | |
|---|---|---|---|
| 5,035,058 A | * | 7/1991 | Date et al. .................... 30/387 |
| 5,050,303 A | | 9/1991 | Sinclair ..................... 30/123.4 |
| 5,669,140 A | * | 9/1997 | Tsumura .................... 30/123.4 |
| 5,778,537 A | | 7/1998 | Leini ......................... 30/123.4 |
| 5,797,187 A | | 8/1998 | Leini et al. ................. 30/123.4 |
| 5,845,402 A | | 12/1998 | Leini ......................... 30/123.4 |

FOREIGN PATENT DOCUMENTS

CH          295 454          3/1954

\* cited by examiner

*Primary Examiner*—Hwei-Siu Payer
(74) *Attorney, Agent, or Firm*—Burns, Doane, Swecker & Mathis, L.L.P.

(57) ABSTRACT

A chainsaw guide bar has tubes to convey liquid such as lubricants, fungicides, paints, etc. The tubes, made of soft deformable metal, are placed in respective grooves formed in the guide bar and are then deformed. The grooves include an undercut side, whereby a portion of the deformed tube is held in its groove by an interference bit defined by the undercut side and a portion of the deformed tube situated behind the undercut side.

18 Claims, 2 Drawing Sheets

Fig. 2
Fig. 3
Fig. 4
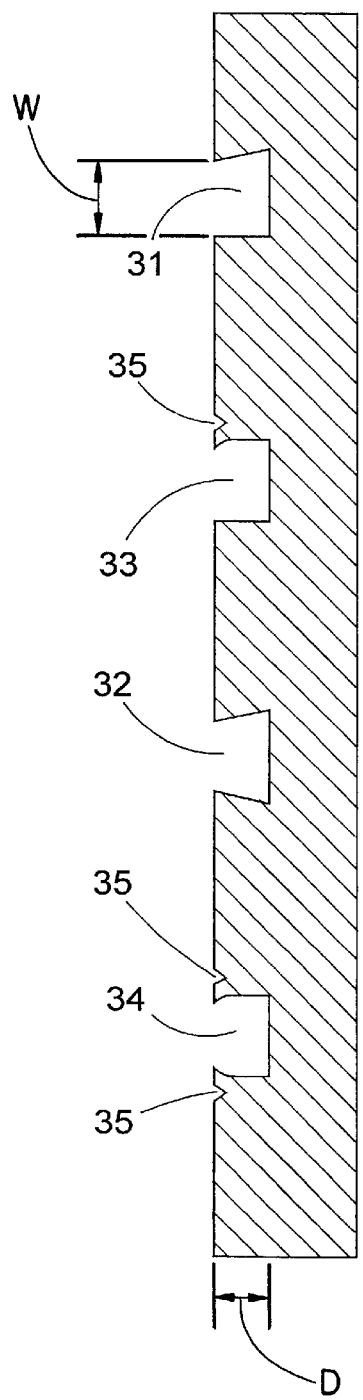
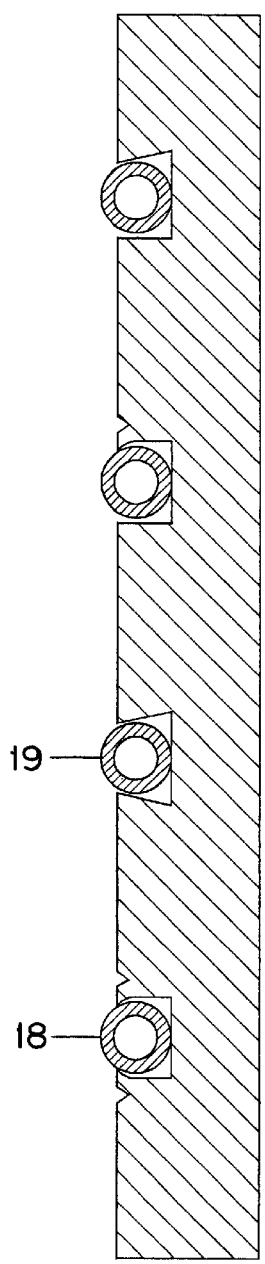
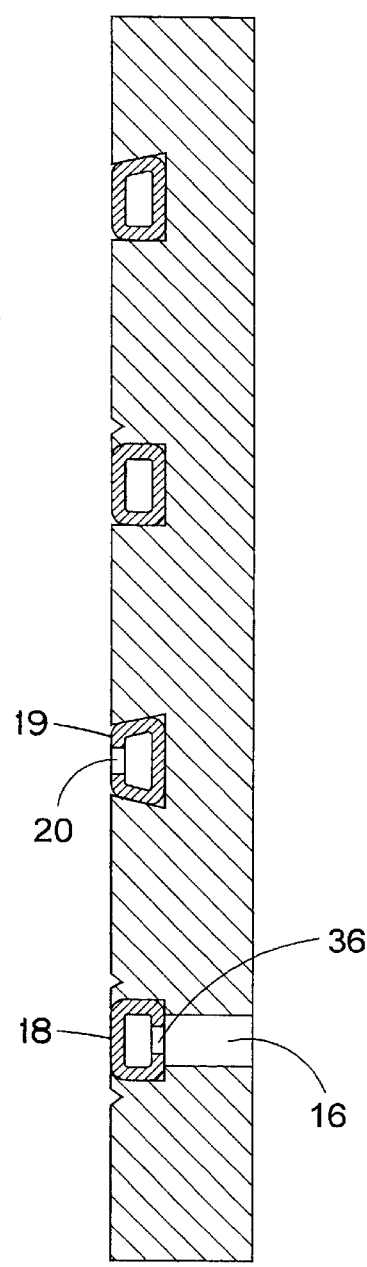

CHAINSAW GUIDE BAR HAVING LIQUID-CONDUCTING CHANNELS

BACKGROUND OF THE INVENTION

The invention relates to chainsaw guide bars and especially to liquid conducting channels in the guide bar. The invention also relates to a method of securing a tube in a guide bar.

It is well known to provide liquid channels in chainsaw guide bars to convey various liquids from the power unit of the chainsaw, such as lubricant for the nose sprocket, urea fungicide to tree stumps, or code marking paint to cut logs. If the guide bar is made from three thin plates welded together, the channels can be made as cut-outs in the middle plate, sealed by the outer plates and the welds, as described in U.S. Pat. Nos. 5,778,537 and No. 5,797,187.

If the channels have to be very pressure tight to avoid mixing of liquids from different channels, it is possible to use separate tubes located in the channels as disclosed in U.S. Pat. No. 5,845,402. One disadvantage with such tubes is that the cross-section available for the liquid is severely limited by the wall thickness of the tube having to be enclosed in a channel having the same thickness as the groove in the guide bar edge.

For guide bars made from one thick solid plate, another way of creating liquid channels has been proposed, where grooves are milled in a surface of the plate, and tubes are located in the grooves, held in place by brazing, soldering or glueing, as described in U.S. Pat. No. 5,050,303 and Swiss Patent 295 454. Since the groove depth is not restricted by the chain groove width, it is easier to use tubes with appropriate wall thickness without reducing the cross-section. The main disadvantage is that brazing or soldering results in heating the entire guide bar to a temperature which lowers its strength, and gluing is not reliable in severe winter cold. Relying on friction alone is not enough, since the bar and the tubes may be made from metals with different thermal expansion.

SUMMARY OF THE INVENTION

The present invention concerns a guide bar having an undercut channel and a tube disposed in the groove and held therein by an interference fit defined by the undercut. Thus, there is no need to employ brazing or soldering which could adversely affect the guide bar.

The invention also pertains to a method of securing the tube in the groove.

BRIEF DESCRIPTION OF THE DRAWINGS

The objects and advantages of the invention will become apparent from the following detailed description of a preferred embodiment thereof in connection with the accompanying drawing in which like numerals designate like elements, and in which:

FIG. 2 is a cross-section through part of the guide bar having grooves according to the invention before the locating of tubes therein;

FIG. 3 shows the same cross-section as FIG. 2 with tubes located in the grooves, and FIG. 4 shows the same cross-section as FIG. 3 with tubes located and deformed therein to stay in place.

DETAILED DESCRIPTION OF PREFERRED EMBODIMENTS OF THE INVENTION

Figure 1:
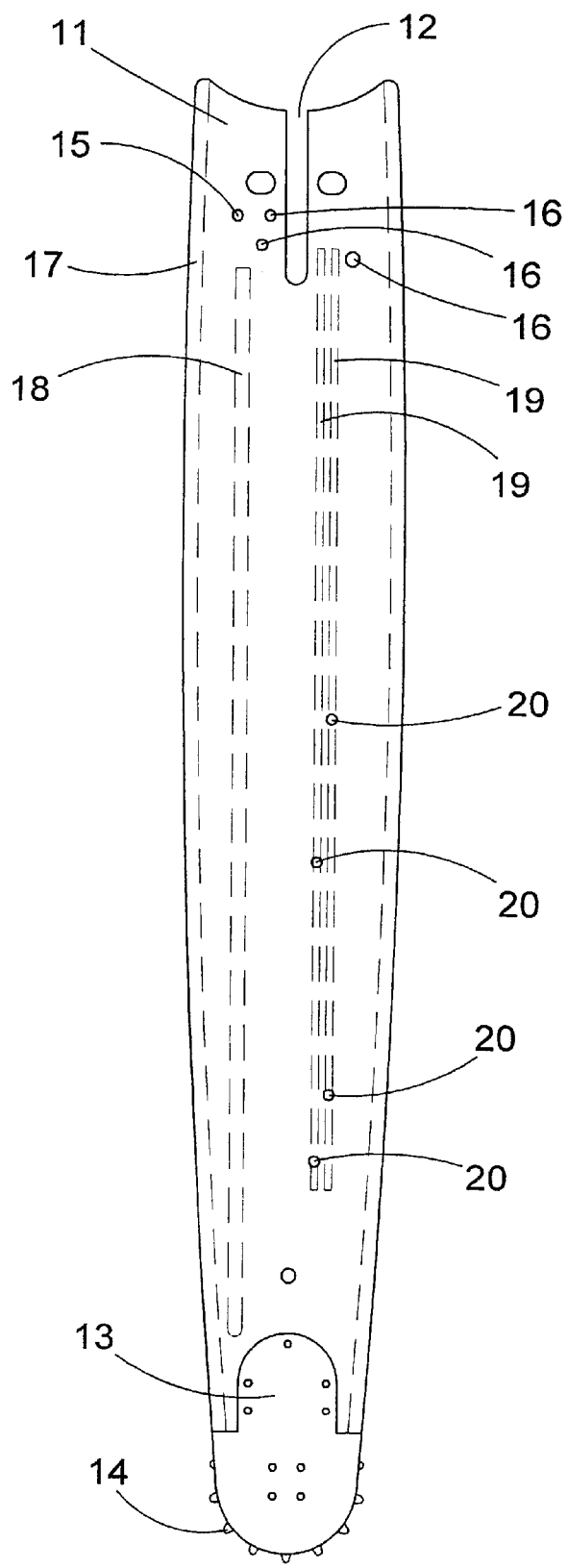
FIG. 1 shows a side view of a guide bar with channels according to the invention.

A guide bar according to the invention has a rear clamping end (11) with a center slot (12) to receive two clamping bolts (not shown), and a front end (13) around which the saw chain can slide, usually carried by a nose sprocket (14). When the guide bar is to be used, the clamping end (11) is clamped against a supporting surface of a power unit. Adjacent to the center slot (12) there are one or more liquid supply holes (15, 16) in the guide bar surface to receive liquid from internal channels in the power unit. Some of the supply holes (15) receive chain lubricating oil and are connected to a chain groove (17) extending along the outer edge of the guide bar to guide and support the saw chain travelling from the rear clamping end to the front end and back. Other supply holes (16) are connected to tubes (18, 19) extending longitudinally through the guide bar.

The tubes may continue all the way to the vicinity of the nose sprocket (14) if the purpose is to convey oil to the sprocket or the portion of the chain that does the actual cutting. The tubes (19) may have a limited length and contain one or more outlet openings (20) to spray liquid into the cut surface of a log or a stump.

The main problem faced by previous designs has been how to retain the tubes in the grooves in spite of vibrations, deformation during use, and liquid leakage. Brazing was suggested in U.S. Pat. No. 5,050,303, but has found little application as it cannot be made without adversely affecting the strength of the guide bar body. Glueing has found some use but is not strong enough to withstand the strains due to temperature differences, vibration and deformation in use, especially since glues tend to be brittle and fragile in winter.

According to the preferred embodiments of the invention, the tubes are originally made with circular cross-section, then located in grooves having undercut sides and deformed to fill the groove.

Examples of shapes for the undercut grooves are shown in FIG. 2; possibly a combination of different groove shapes could be combined in the same guide bar. One type of groove (31) can be made with one side undercut. Another type (32) may have both sides undercut (32) by milling with a radial or axial milling tool, by passing the tool twice through the groove if necessary. A groove type (33 or 34) can also be made with originally parallel sides, which in a second operation are made undercut on one or both sides by impressing a narrow ditch (35) formed in a surface in which the groove is formed, the ditch(es) formed on one or both sides of the groove. The groove depth D is smaller than the groove width W, preferably the depth is between 75 and 50% of the width.

The tubes (18, 19) are preferably made from a soft deformable metal such as copper or soft brass. At least a rear end of the tube is sealed by compressing and then soldering the tube. The rear end of each milled groove is located at the opposite side of the corresponding supply hole (16). After inserting the tube into the groove as shown in FIG. 3, the tube is deformed by rolling or pressing until it fills the groove and conforms to the undercut sides as shown in FIG. 4. This operation securely fastens the tube solely by an interface fit defined by the undercut side of the groove and a portion of the tube disposed behind the undercut side, i.e., there is no need for brazing or soldering.

If it is desired to employ the technique of impressing ditch(es) 35 in order to form the undercut characteristic of the grooves, the undercut can be formed either before or after the tube is inserted into the groove. Also, in the case where the undercut is formed subsequent to the tube insertion, the deforming of the tube can be effected either before or after the undercut is formed.

The tube is then connected to the corresponding supply hole (16) by drilling an aperture (36) through the tube wall near a rear end of the tube. At a location near the front end of the guide bar openings (20) for spraying liquid onto the cut surface of a log or a stump are drilled through the tube wall. For customers with individual requirements as to spray patterns, this may be done after delivery to the customer. If desired, the frontmost (outer) end of the openings may be wider but closeable, to admit compressed air for cleaning of the liquid channel. If the spray openings (20) are to be at the same guide bar surface as the supply holes, the openings may either be drilled through the guide bar body as well as through the tube wall, or the groove may pass through the guide bar body from one surface to the other. Tubes to convey lubricating oil should be connected to the sprocket or the chain groove at the front end.

Chainsaw guide bars are usually reversible to equalize the wear along the longitudinal edges, and in such a case there are two sets of tubes on respective sides of the guide bar. At present, reversible bars have a great problem that the liquid spray openings (20) on the side not being used have a tendency to become clogged by sawdust and resin, and are useless when the bar is reversed. A guide bar according to the invention can easily have such holes cleaned with a narrow pick, or can be delivered without openings on one side, which can then be drilled by the customer when the guide bar is to be reversed. This can also allow a customer to have different spray patterns on different sides, depending on tree dimensions or tree species.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Chainsaw guide bar comprising a pair of side surfaces extending from a rear end to a front end of the guide bar, at least one of the side surfaces having a groove formed therein extending in a generally rear-to-front direction, the groove including an undercut side, and a tube disposed in the groove and secured therein solely by an interference fit defined by the undercut side and a portion of the tube disposed behind the undercut side, the tube formed of a malleable material and including a substantially flat outer surface lying substantially flush with the one side surface of the guide bar.

2. The chainsaw guide bar according to claim 1 wherein the groove has a depth and a minimum width, the depth being smaller than the minimum width.

3. The chainsaw guide bar according to claim 1 further comprising a plurality of the grooves formed in the one side surface, and a plurality of the tubes disposed in respective ones of the plurality of the grooves.

4. The chainsaw guide bar according to claim 1 wherein the tube has a cross section substantially corresponding to the cross sectional shape of the groove.

5. The chainsaw guide bar according to claim 1 wherein the tube is formed of a soft metal.

6. The chainsaw guide bar according to claim 5 wherein the soft metal is copper.

7. The chainsaw guide bar according to claim 5 wherein the soft metal is brass.

8. The chainsaw guide bar according to claim 1 wherein the guide bar is formed of a single solid plate.

9. The chainsaw guide bar according to claim 1 wherein the tube includes at least one outlet opening formed therein and directed laterally outwardly with respect to a longitudinal axis of the tube.

10. The chainsaw guide bar according to claim 9 wherein the guide bar includes a rear clamping end and a front end, the groove terminating short of the front end.

11. The chainsaw guide bar according to claim 1 wherein the groove has a dovetail cross section shape.

12. The chainsaw guide bar according to claim 1 wherein the guide bar includes a rear clamping end and a front end, the groove terminating short of the front end.

13. A method of mounting a liquid conducting tube in a groove formed in a side surface of the guide bar, wherein a width of the groove at a mouth thereof disposed at the side surface of the guide bar is shorter than a width of the groove located inwardly of the mouth, the method comprising the steps of:

A. inserting into the groove a malleable tube formed of a malleable material; and B. deforming the tube, subsequently to step A, such that the tube assumes a non-circular cross sectional shape substantially conforming to the groove cross-sectional shape, wherein the tube is secured in the groove by an interference fit.

14. The method according to claim 13 further including the step of providing at least one outlet opening in the tube directed laterally outwardly with respect to a longitudinal axis of the tube for discharging liquid.

15. The method according to claim 13 wherein step B comprises securing the tube in the groove solely by the interference fit.

16. The method according to claim 13 wherein step B includes flattening an outer surface of the tube such that the flattened outer surface is substantially flush with the side surface of the guide bar.

17. In a method of mounting a liquid conducting tube in a chainsaw guide bar by forming, in a side surface of the guide bar, a groove extending in a generally rear-to-front direction of the guide bar, inserting the tube into the groove, and securing the tube against removal from the groove, the improvement wherein the securing of the tube against removal from the groove comprises the steps of:

A) inserting the tube into the groove;

B) forming an undercut in a side of the groove subsequent to step A; and

C) deforming the tube such that the tube is secured in the groove by an interference fit defined by the undercut side and a portion of the deformed tube situated behind the undercut side.

18. In a method of mounting a liquid conducting tube in a chainsaw guide bar by forming, in a side surface of the guide bar, a groove extending in a generally rear-to-front direction of the guide bar, inserting the tube into the groove, and securing the tube against removal from the groove, the improvement wherein the securing of the tube against removal from the groove comprises the steps of:

A) impressing a ditch in the side surface of the guide bar alongside at least one side of the groove to deform the one side, whereby the deformed one side defines an undercut side of the groove; and B) deforming the tube such that the tube is secured in the groove by an interference fit defined by the undercut side and a portion of the deformed tube situated behind the undercut side.

* * * * *